Figure 1:
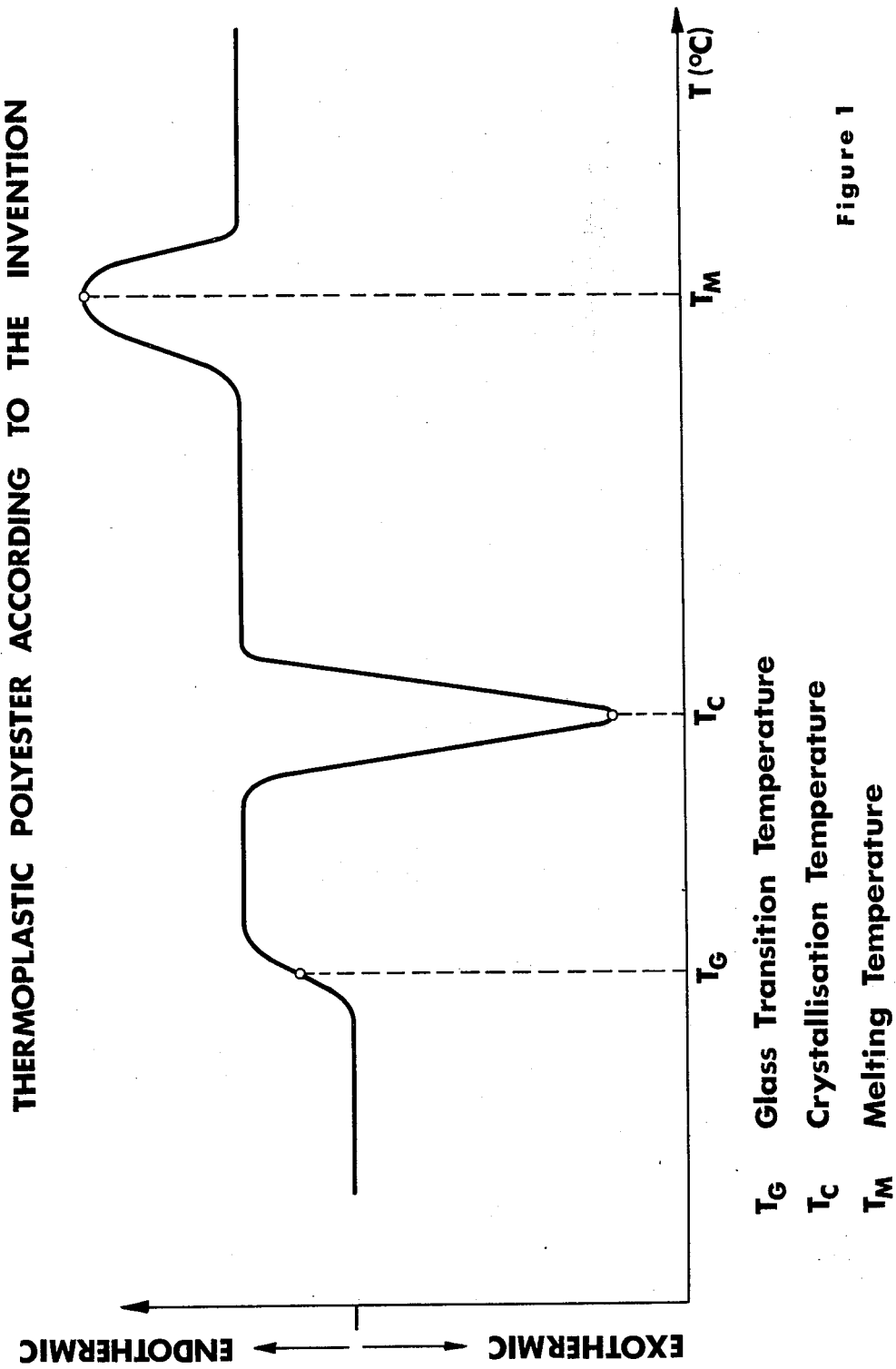

United States Patent [19]

Buxbaum et al.

[11] B  3,994,864

[45] Nov. 30, 1976

[54] LINEAR, THERMOPLASTIC POLYESTERS

[75] Inventors: Lothar Buxbaum, Lindenfels, Germany; Jurgen Habermeier, Pfeffingen; Hans Batzer, Arlesheim, both of Switzerland

[73] Assignee: Ciba-Geigy Corporation, Ardsley, N.Y.

[22] Filed: Feb. 24, 1975

[21] Appl. No.: 552,489

[44] Published under the second Trial Voluntary Protest Program on February 10, 1976 as document No. B 552,489.

Related U.S. Application Data

[63] Continuation-in-part of Ser. No. 488,625, July 15, 1974.

[30] Foreign Application Priority Data

July 30, 1973  Switzerland...................... 11054/73

[52] U.S. Cl................................................ 260/75 N
[51] Int. Cl.$^2$.......................................... C08G 63/68
[58] Field of Search................................... 260/75 N

[56] References Cited
UNITED STATES PATENTS

| 3,856,754 | 12/1974 | Habermeier et al............. 260/75 N |
| 3,860,564 | 1/1975 | Habermeier et al............. 260/75 N |

*Primary Examiner*—Lewis T. Jacobs
*Assistant Examiner*—W. C. Danison, Jr.
*Attorney, Agent, or Firm*—Luther A. R. Hall

[57] ABSTRACT

Linear polyesters based on terephthalic acid and/or isophthalic acid and containing di-(hydroxyalkyl) compounds of oligomeric N,N-heterocyclic compounds as the diol component, have higher glass transition temperatures compared with poly-(alkylene) terephthalates. The new polyesters are thermoplastic materials suitable for the manufacture, by customary moulding processes, of mouldings having a higher heat distortion point.

6 Claims, 1 Drawing Figure

LINEAR, THERMOPLASTIC POLYESTERS

This is a continuation-in-part of copending application Ser. No. 488,625, filed July 15, 1974.

The present invention relates to new, linear polyesters based on terephthalic acid and/or isophthalic acid and containing di-(hydroxyalkyl) compounds of oligomeric N,N-heterocyclic compounds as the diol component, a process for the manufacture of the new polyesters and the use of these polyesters, which are valuable thermoplastic materials.

Thermoplastic polyesters based on terephthalic acid or isophthalic acid and aliphatic diols, such as, for example, polyethylene terephthalates and polybutylene terephthalates, are known. Furthermore, the use of these polyesters for the manufacture of mouldings having good mechanical properties or for the coating of objects, for example for insulating purposes, is known. However, the articles manufactured from these polyesters also have disadvantages, particularly in their thermomechanical properties. Thus, the glass transition point of these polyesters is generally relatively low, which is found to be a disadvantage in many industrial applications, because the mouldings lose their rigidity even at relatively low temperatures. A further disadvantage of the known polyethylene terephthalates and polybutylene terephthalates consists of the fact that fairly high temperatures must be used in their processing.

German Offenlegungsschrift DT 2,008,984 discloses that the properties of polyethylene terephthalates and polybutylene terephthalates can be improved by co-condensing dispiro-(5.1.5.1.)-tetradecane-7,14-diol into the polyester, 15 – 50% of the ethylene glycol or propylene glycol being replaced by this special, expensive, tricyclic diol.

It has now been found that polyesters composed of terephthalic acid and/or isophthalic acid and aliphatic diols with improved properties can also be obtained by the cocondensation of oligomeric di-(hydroxyalkyl) compounds containing more than two N,N-heterocyclic rings, which can be prepared cheaply. It is surprising that the improvement of the properties of these polyesters is achieved by means of compounds which contain hydroxyethyl groups and in which the N,N-heterocyclic rings are linked via methylene groups and/or, if appropriate, also via substituted ethylene groups, since it is known that, owing to the powers of free rotation of these groups, they do not bring rigidity into the molecule. It is also surprising that the degree of improvement in the properties which can be achieved is higher the more N,N-heterocyclic rings the di-(hydroxyalkyl) compounds according to the invention contain. In addition, excellent properties are displayed even by polyesters which are synthesised only from terephthalic acid and/or isophthalic acid and the heterocyclic diol. In the following text polyesters are understood as all polymers consisting of either one acid and one diol component or two acid components and one diol component or one acid component and two diol components. In addition, the term polyester also comprises polymers synthesised from two acid components and two diol components. In all cases the polyesters are random copolymers except when only one acid and one diol component are involved.

Compared with the polyalkylene terephthalates, the polyesters according to the invention are distinguished by higher glass transition temperatures and, at the same time, low melting points or softening points; thus they display better thermo-mechanical properties and can be processed more easily.

The present invention therefore relates to new, linear, thermoplastic polyesters and random copolyesters having a relative viscosity of 0.5 to 4.0, measured at 30°C on a 1% strength solution consisting of equal parts of phenol and tetrachloroethane, which are characterised by a repeating unit of the general formula I

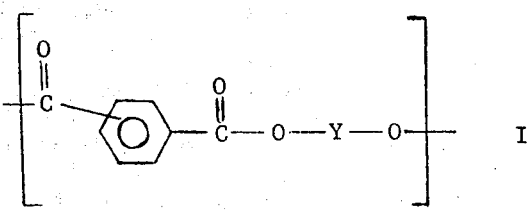

wherein the carbonyl groups can be linked to the aromatic rings in the meta- and/or para-position, Y represents $m$ moles of E and $n$ moles of

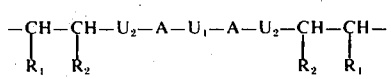

in a mixture so general formula I represents a random copolymer except when $m$ is zero and only one acid component is used, E represents an aliphatic radical with 2 to 10 carbon atoms which is linear or is branched by means of a methyl or ethyl group, or represents the 1,4-dimethylenecyclohexane radical, $R_1$ denotes in each case a hydrogen atom or a methyl, ethyl or phenyl group, and $R_2$ denotes a hydrogen atom or, conjointly with $R_1$, denotes the tetramethylene radical, A denotes a radical of the formulae

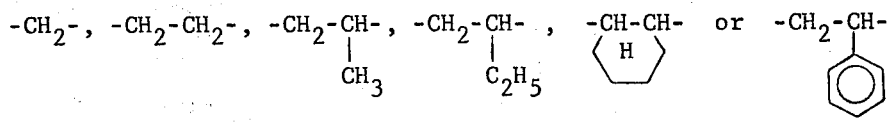

$U_1$ denotes a radical of the formulae

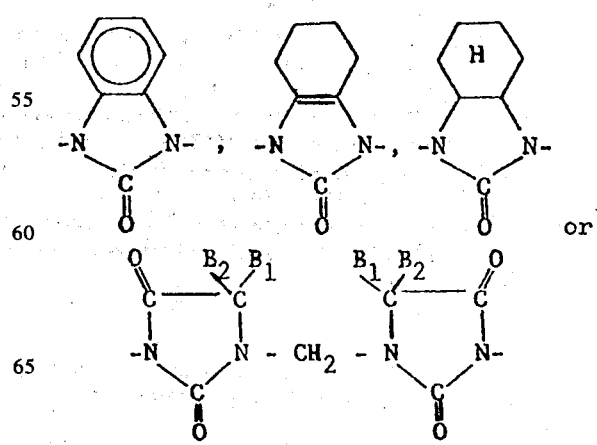

wherein $B_1$ and $B_2$ independently of one another each denote a hydrogen atom or an alkyl radical with 1 to 4 carbon atoms, and $U_2$ has the same meaning as $U_1$ or denotes a radical of the formula

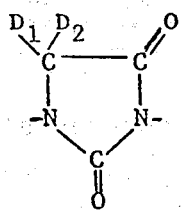

wherein $D_1$ and $D_2$ independently of one another each denote a hydrogen atom, an alkyl radical with 1 to 4 carbon atoms or the phenyl radical or, conjointly, denote the pentamethylene radical, $m$ represents 0 or integers and $n$ represents integers, it being possible for the mol fraction $n/(n + m)$ derived from $n$ and $m$ to assume values from 0.02 to 1.

Preferably, the polyesters with the repeating unit of the formula I have a relative viscosity of 1.0 to 3.0, the carbonyl groups are linked to the aromatic rings in the meta- and/or para-position, E denotes an aliphatic radical with 2 to 4 carbon atoms, $R_1$ and $R_2$ each denote a hydrogen atom, A denotes the methylene or ethylene radical, $U_1$ denotes a radical of the formulae

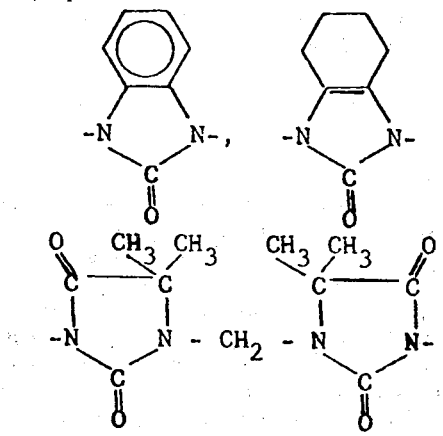

or and $U_2$ denotes a radical of the formula

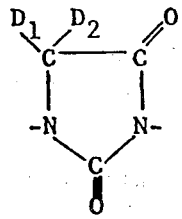

wherein $D_1$ and $D_2$ represent the methyl group or, conjointly, represent the pentamethylene radical, and the mol fraction $n/(n + m)$ has values from 0.05 to 1.

The new polyesters with the structural element of the formula I are obtained by known processes, by polycondensing $n$ mols, or if appropriate $n+m$ mols, of terephthalic acid, isophthalic acid or polyester-forming derivatives thereof as well as mixtures of these acids or their polyester forming derivatives with $n$ mols of a diol of the formula II

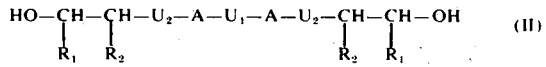  (II)

wherein $R_1$, $R_2$, A, $U_1$ and $U_2$ have the same meaning as in formula I, if appropriate mixed with $m$ mols of a diol of the formula III

  (III)

wherein E has the same meaning as in formula I, corresponding to the mol fraction $n/(n + m) = 0.02$ to 1.0, and in the presence of catalysts, in a known manner to give a relative viscosity of 0.5 to 4.0.

Terephthalic acid, isophthalic acid or polyester-forming derivatives thereof are preferably polycondensed in a molar ratio corresponding to the mol fraction $n/(n + m) = 0.05$ to 1.0, to give a relative viscosity of 1.0 to 3.0.

Examples of the known processes for the preparation of the new polyesters are solution condensation or azeotropic condensation, interfacial condensation, melt condensation or solid phase condensation as well as a combination of these methods, depending on which polyester-forming derivatives and reaction catalysts are used.

The polyester-forming derivatives of terephthalic acid and isophthalic acid used are principally the low molecular dialkyl esters with 1 to 4 carbon atoms in the molecule, preferably dimethyl esters or diphenyl esters. In addition, the acid dihalides, especially the acid dichlorides, and polyanhydrides of terephthalic acid or isophthalic acid as well as mixed anhydrides of these acids and low molecular aliphatic monocarboxylic acids are also suitable.

The known aliphatic diols with 2 to 10 carbon atoms which are linear or are branched by means of a methyl or ethyl group, and 1,4-dihydroxymethylcyclohexane are represented by means of the formula III.

The diols of the formula II are new compounds which are obtained according to a process described in German Offenlegungsschrift 2,003,016, according to the following schedule of reactions:

1 mol of the known compound of the formula IV
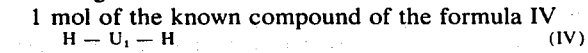  (IV)

is condensed with 2 mols of the known monohalogen compound of the formula V
  (V)

wherein "Hal" represents a halogen atom, at temperatures between 20° and 200°C in a suitable solvent, for example water or dioxane, and in the presence of a base, for example NaOH or pyridine, with the elimination of 2 mols of hydrogen halide. In a variant of the process, 1 mol of a dihalogen compound of the formula VI
  (VI)

is reacted with 2 mols of a compound of the formula VII
  (VII)

with the elimination of 2 mols of hydrogen halide.

1 mol of the new compounds of the general formula VIII
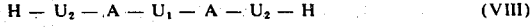  (VIII)

prepared by these processes, is reacted, by an addition reaction with 2 mols of an alkylene oxide of the formula IX

  (IX)

in the presence of an acid or basic catalyst, for example $AlCl_3$ or triethylamine, and at temperatures between 0° and 200° C, to give the diols of the formula II. In the preceding reaction schedule, $U_1$, $U_2$, A, $R_1$ and $R_2$ have the same meaning as in formula I.
Compounds corresponding to the formula IX are, in addition to ethylene oxide, propylene oxide, butylene oxide, styrene oxide and cyclohexylene oxide.
The following are examples of diols of the formula II:
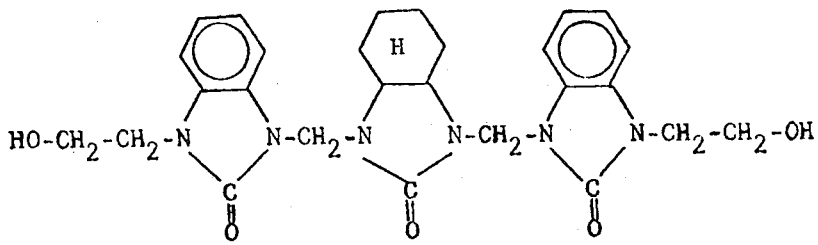
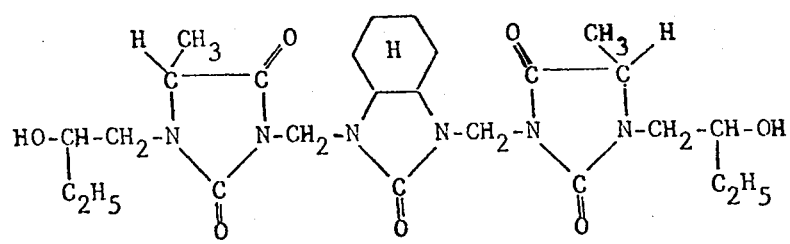
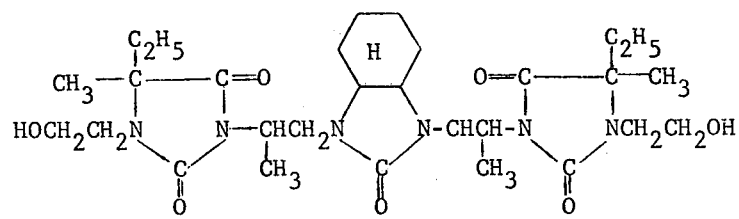
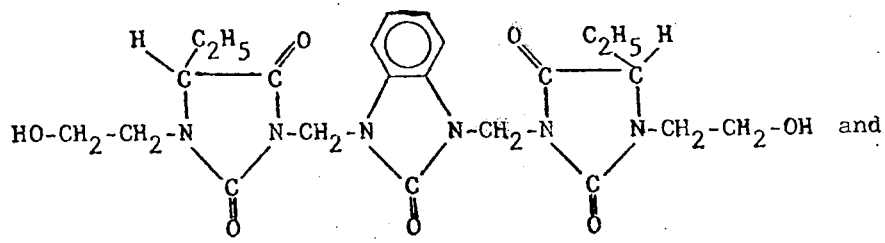
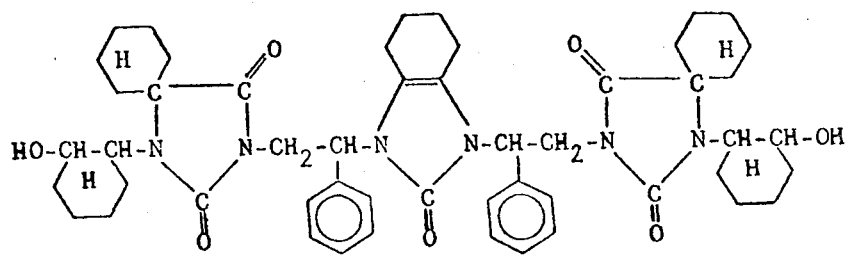

The following are examples of possible preferred diols of the formula II:

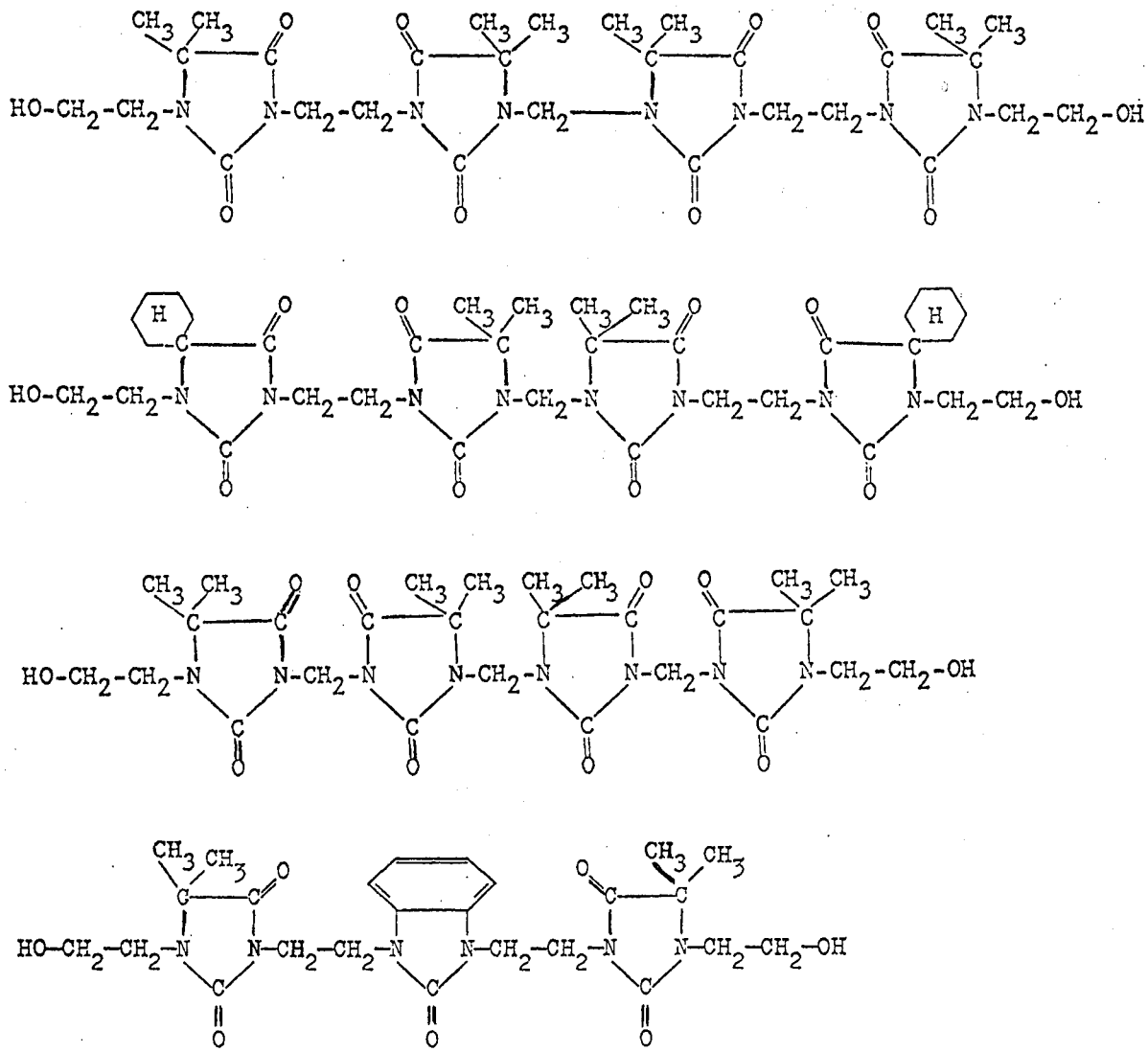

In particular, the mol fraction derived from *n* and *m* in formula I is 0.2 to 1 for the preferred diols.

The new polyesters can be prepared by esterifying or transesterifying at 150°–250°C terephthalic acid, isophthalic acid or low molecular dialkyl esters thereof with the diols of the formula II, preferably mixed with the diols of the formula III, in an inert atmosphere, for example a nitrogen atmosphere, in the presence of catalysts and with simultaneous removal of the water or alkanol formed, and by subsequently carrying out the polycondensation at 200° – 270°C and under reduced pressure in the presence of certain catalysts, until the polycondensates have the desired viscosity.

In the preparation of polyesters which also contain, besides a diol according to the invention, compounds of the formula III as the aliphatic diol component, this diol component is advantageously used in excess, so that, after the esterification or transesterification reaction, essentially monomeric diglycol esters of both diols of the formulae II and III are obtained, which are then polycondensed in the presence of a polycondensation catalyst and with the removal by distillation in vacuo of the excess aliphatic diol of the formula III.

Amines, inorganic or organic acids, for example hydrochloric acid or p-toluenesulphonic acid, or else metal compounds, which are also suitable as transesterification catalysts, can be used in a known manner as the esterification catalysts.

Since some catalysts preferentially accelerate the transesterification and others preferentially accelerate the polycondensation, it is advantageous to use a combination of several catalysts. Examples of suitable transesterification catalysts are the oxides, salts or organic compounds of the metals calcium, magnesium, zinc, cadmium, manganese, titanium and cobalt. The metals as such can also be used as catalysts. The polycondensation is catalysed, for example, by metals such as lead, titanium, germanium and, in particular, antimony or compounds thereof. These catalysts can be added to the reaction mixture together or separately. These catalysts are employed in quantities of about 0.001 to 1.0 per cent by weight, relative to the acid component.

In the preparation of the new polyesters it is particularly advantageous to use those catalysts which accelerate both the transesterification and the polycondensation. Possible catalysts of this kind are above all mixtures of various metals or metal compounds as well as corresponding metal alloys.

It is also possible to carry out the polycondensation in such a way that the starting compounds are first condensed, in the melt, to give a certain viscosity, the precondensate thus prepared is then granulated, for example with the aid of an underwater granulator, and the granules are dried and then subjected to a solid phase condensation, a vacuum and temperatures below the melting point of the granules being used. In this way higher viscosities can be achieved in the polyesters.

The polycondensation reaction is carried out until the polyesters have a relative viscosity of 0.5 to 4.0, preferably 1.0 to 3.0. The reaction times are about 30 minutes to several hours, depending on the nature of the catalyst used and the size of the batch. After being removed from the reaction vessel and cooled in the usual way, the resulting polyester melts are granulated or chipped.

Another process for the preparation of the new polyesters consists of polycondensing terephthalic acid dihalides and/or isophthalic acid dihalides, preferably the acid dichlorides, with the diols of the formula II, optionally mixed with the diols of the formula III, in the presence of a basic catalyst in the temperature range from 0° to 100°C with elimination of hydrogen halide. Tertiary amines or quaternary ammonium salts are preferably used as the basic catalysts. The proportion of the basic catalyst can be from 0.1 to 100 mol%, relative to the acid halides. This process can also be carried out without a solvent or in the presence of a solvent.

When working up the polyester melts or even before the polycondensation reaction, it is possible to add to the reaction mass inert additives of all kinds, such as, for example, fillers, reinforcing materials, especially glass fibres and/or glass spheres, inorganic or organic pigments, optical brighteners, delustering agents, agents for promoting crystallisation and additives for rendering the material incombustible or flame-retarding, such as, for example, antimony trioxide and organic compounds having a high content of chlorine and bromine.

If the polycondensation reaction is carried out discontinuously, these known measures can be taken even during the last step of the condensation, for example in the solid phase condensation or even at the end of the melt condensation.

The polyesters according to the invention can be partly crystalline or amorphous, depending on which diols and which dicarboxylic acids are used as the starting components and the ratios in which the latter are employed.

The new polyesters are colourless to pale yellow and represent thermoplastic materials from which, after the customary moulding processes, such as casting, injection moulding and extrusion, mouldings with valuable thermo-mechanical properties can be produced.

The new polyesters are particularly suitable as "Engineering Plastic" materials which are suitable for the production of shaped articles, such as cog wheels, containers for chemicals or food, machine parts and equipment parts, sheets, plates, films, hot-melt adhesives and coatings, and also for the production of semi-fabricated products which can be shaped by machining.

The polyesters prepared in the examples which follow are more fully characterised by means of the following characteristic data: The polyesters are characterised by means of those morphological changes which are measured by means of differential thermal analysis on a sample heat-treated for 3 minutes at 30°C above the melting point or softening point and then rapidly cooled. The quenched sample is heated at a heating-up speed of 16°C/minute by means of the "DSC-1B" differential scanning calorimeter of Messrs. Perkin-Elmer. The thermogram of the sample (compare the diagrammatic representation in FIG. 1) shows the glass transition temperature ($Tg$), the crystallisation temperature ($Tc$) and the melting point ($Tm$). The glass transition temperature is indicated in the thermogram as the point of inflexion at the sudden increase in the specific heat, the crystallisation temperature is indicated as the crest of the exothermic peak and the melting point is indicated as the crest of the endothermic peak. The relative viscosity of the polycondensates of the examples is determined at 30°C on solutions of 1 g of polyester in 100 ml of a mixture consisting of equal parts of phenol and tetrachloroethane. The softening point ($Ts$) is determined on a Kofler microscope with a heated stage having a heating-up speed of 15°C/minute, a cross being formed out of 2 filaments and the softening point being designated as that temperature at which the sharp corners of the cross disappear. The nitrogen content is determined by means of elementary analysis.

EXAMPLE 1

Preparation of a random copolyester from 1,4-butanediol, dimethyl terephthalate and a diol A of the formula

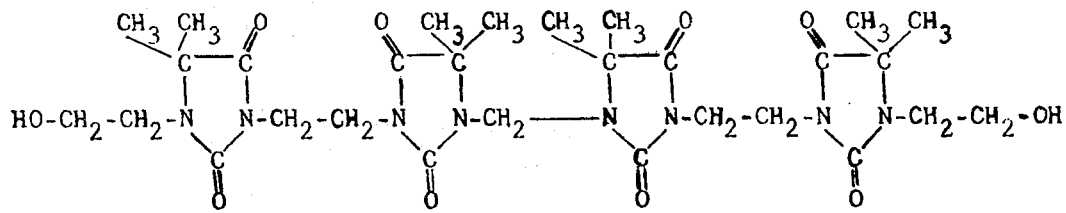

A mixture of 97.1 g of dimethyl terephthalate (DMT) (0.5 mol), 99.1 g of 1,4-butanediol (1.1 mol), 33.2 g of diol A (10 mol% relative to DMT) and 0.05 g of tetraisopropyl orthotitanate is condensed under an atmosphere of nitrogen and with slow stirring according to the following temperature/pressure programme:

1 hour at 150° – 200°C/$N_2$/atmospheric pressure
1 hour at 200° – 260°C/$N_2$/atmospheric pressure
1 hour at 260°C/$N_2$/20 mm Hg → 0.1 mm Hg
1 hour at 260°C/$N_2$/0.1 mm Hg.

The reaction product is then poured out onto a metal sheet to cool under a N₂ atmosphere.

The partly crystalline copolyester thus obtained, which has a horn-like appearance, has the following characteristics:

| | |
|---|---|
| Softening point (Kofler): | 190°C |
| Relative viscosity: | 1.60 |
| Glass transition temperature (DSC) | 77°C |
| Nitrogen content: | 4.00% (theory 3.96%) |

EXAMPLE 2

Preparation of a random copolyester from 1,4-butanediol, dimethyl terephthalate and a diol B of the formula

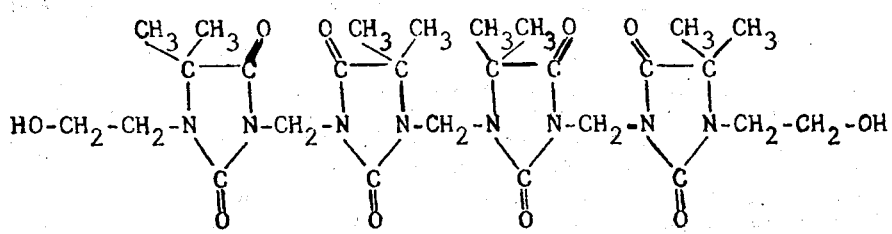

A mixture of 75 g of dimethyl terephthalate (DMT) (0.386 mol), 70 g of 1,4-butanediol (0.777 mol), 24.6 g of diol B (10 mol% relative to DMT) and 0.045 g of tetraisopropyl orthotitanate is condensed under a nitrogen atmosphere and with slow stirring according to the following temperature/pressure programme:

1 hour at 160°C/N₂/atmospheric pressure
2 hours at 160°C → 245°C/N₂/atmospheric pressure
1 hour at 245°C/N₂/atmospheric pressure → 18 mm Hg
30 minutes at 245°C/N₂/18 mm Hg → 0.5 mm Hg and
1 hour at 265°C/N₂/0.5 mm Hg.

The reaction product is then poured out onto a metal sheet to cool under a N₂ atmosphere.

The virtually colourless, partly crystalline copolyester thus obtained has the following characteristics:

| | |
|---|---|
| Softening point by Koflers method: | 207°C |
| Relative viscosity | 1.62 |
| Glass transition temperature (DSC) | 93°C |
| Nitrogen content found: | 3.85% (theory 4.08%) |

COMPARISON EXAMPLE

An analogous mixture, but containing instead of 10 mol% of the diol according to Example 2, 20 mol% of 1,1'-methylene-bis-[3-(2'-hydroxy-ethyl)-5,5-dimethylhydantoin] is condensed under the conditions quoted in Example 2. A random copolyester is obtained in this way which contains, by way of comparison with the copolyester according to Example 2, almost the same proportion by weight of dimethylhydantoin radicals and which has the properties given in the table which follows.

The following table also gives the figures for a commercially available polybutylene terephthalate:

| | Copolyester according to Example 2 | Copolyester according to the comparison Example | Polybutylene terephthalate |
|---|---|---|---|
| Softening point (by Koflers method) °C | 207 | Approx. 185 | 223 |
| Relative viscosity | 1.62 Partly crystalline | 1.70 Partly crystalline | 2.2 Partly crystalline |
| Glass transition temperature (DSC) °C | 93 | 59 | 24 |

If, instead of 20 mol% of the diol used in the comparison Example, only 10 mol% are used, a copolyester having a glass transition temperature of only 45°C is obtained.

EXAMPLES 3 – 11

The starting products in the molar ratio specified in Table 1 are introduced into a 200 ml glass reactor having a stirrer, a nitrogen inlet and a condenser, and 0.01% of titanium tetraisopropylate are added as catalyst. The reaction mixture is heated to 250°C over the course of one hour under nitrogen and in an oil bath and is kept at this temperature for a further hour. In the course thereof 98% of the theoretical quantity of methanol or phenol distil off.

The temperature of the oil bath is now adjusted to 270°C and, after half an hour, a vacuum of 0.2 mm Hg is carefully applied. After this vacuum has been attained, polycondensation is carried out for two hours with stirring and nitrogen is then admitted and the polyester is taken out of the reactor.

| Example No. | Starting products | (Molar ratio) | $\eta_{rel}$ | $T_G$ (°C) | $T_S$ (°C) |
|---|---|---|---|---|---|
| 3 | DMT, Diol B, B 14 | 1:0.5:1.5 | 1.20 | 104 | 150 |
| 4 | DPT, Diol B | 1:1 | 1.18 | 152 | 180 |
| 5 | DPT, Diol B, CHDM | 1:0.5:0.5 | 1.24 | 129 | 155 |
| 6 | DMT, DMI, Diol B, EG | 0.7:0.3:0.3:2 | 1.31 | 102 | 150 |
| 7 | DMT, Diol C, EG | 1:0.1:2.2 | 1.67 | 85 | 160 |
| 8 | DMT, Diol C, B 14 | 1:0.2:2.0 | 1.58 | 63 | 185* |
| 9 | DMT, Diol B, EG | 1:0.3:2.0 | 1.26 | 105 | 145 |
| 10 | DMT, Diol B, EG | 1:0.5:1.5 | 1.23 | 120 | 150 |
| 11 | DMT, Diol D, EG | 1:0.15:2.2 | 1.28 | 107 | 170 |
| Comparison Example | DMT, EG | 1:2.2 | 1.72 | 72 | 253* |

*Melting point (DSC)

DMT : Dimethyl terephthalate
DPT : Diphenyl terephthalate
DMI : Dimethyl isophthalate
B 14 : Butanediol-1,4
EG : Ethylene glycol
CHDM : Cyclohexanedimethanol-1,4

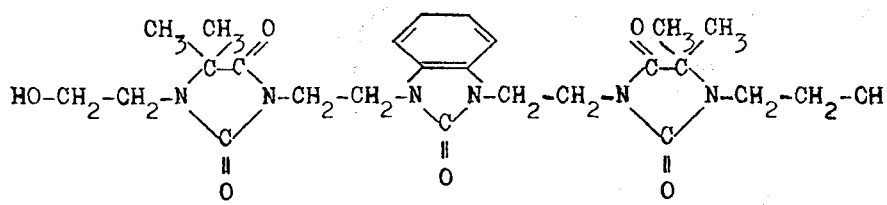

Diol D:

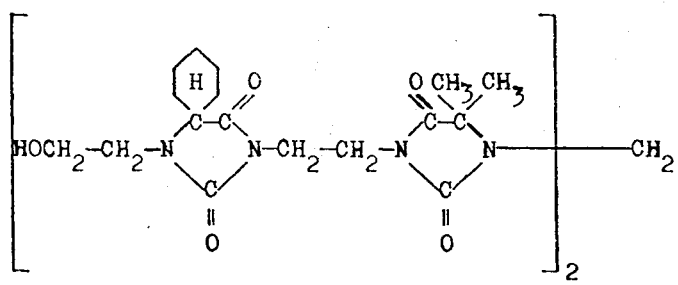

What is claimed is:
1. A linear, thermoplastic polyester or random copolyester having a relative viscosity of 0.5 – 4.0, measured at 30°C on a 1% strength solution consisting of equal parts of phenol and tetrachloroethane, characterised by a repeating unit of the general formula I

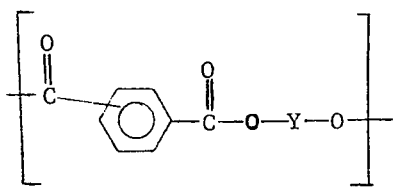

(I)

wherein the carbonyl groups can be linked to the aromatic rings in the meta- and/or para-position, Y represents $m$ moles of E and $n$ moles of

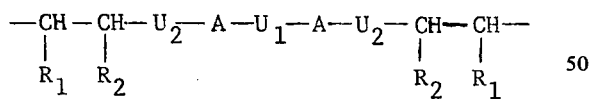

in a mixture so general formula I represents a random copolymer except when $m$ is zero and only one acid component is used, E represents an aliphatic radical with 2 to 10 carbon atoms which is linear or is branched by means of a methyl or ethyl group, or the 1,4-dimethylenecyclohexane radical, $R_1$ in each case denotes a hydrogen atom, or a methyl, ethyl or phenyl group, and $R_2$ denotes a hydrogen atom or, conjointly with $R_1$, denotes the tetramethylene radical, A denotes a radical of the formulae

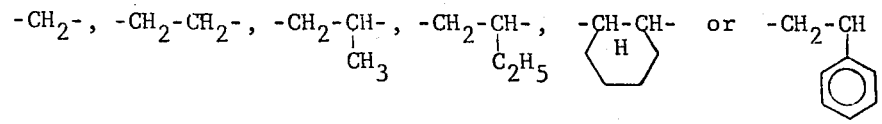

$U_1$ denotes a radical of the following formulae

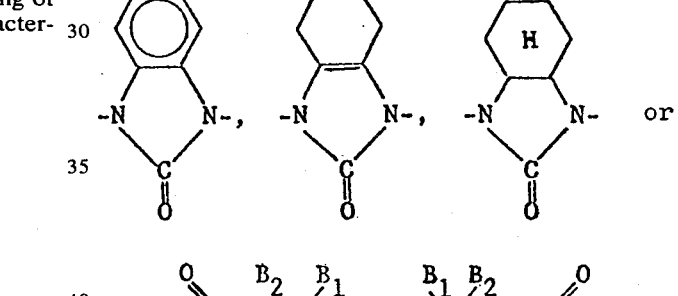

wherein $B_1$ and $B_2$ independently of one another each denote a hydrogen atom or an alkyl radical with 1 to 4 carbon atoms, and $U_2$ has the same meaning as $U_1$ or denotes a radical of the formula

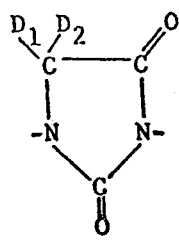

wherein $D_1$ and $D_2$ independently of one another each denote a hydrogen atom, an alkyl radical with 1 to 4 carbon atoms or the phenyl group or, conjointly, denote the pentamethylene radical, $m$ represents 0 or integers and $n$ represents integers, it being possible for the mol fraction $n/(n + m)$ derived from $n$ and $m$ to assume values from 0.02 to 1.

2. A polyester or random copolyester according to claim 1 having a relative viscosity of 1.0 to 3.0 characterised in that the mol fraction $n/(n + m)$ assumes values from 0.05 to 1.

3. A polyester or random copolyester according to claim 1, having a relative viscosity of 1.0 to 3.0, wherein the carbonyl groups are linked to the aromatic ring in the meta- and/or para-position, E represents an aliphatic radical with 2 to 4 carbon atoms, $R_1$ and $R_2$ each denote a hydrogen atom, A denotes the methylene or ethylene radical, $U_1$ denotes a radical of the formulae

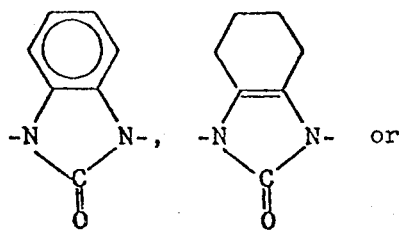

or

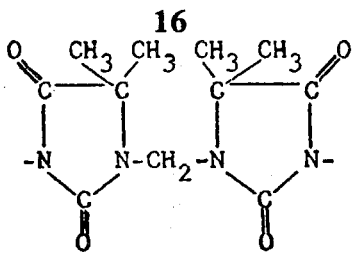

and $U_2$ denotes a radical of the formula

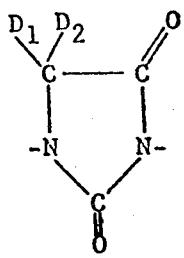

wherein $D_1$ and $D_2$ represent the methyl group or, conjointly, represent the pentamethylene radical, the mol fraction $n/(n + m)$ being 0.05 to 1.

4. A polyester or random copolyester according to claim 3, characterised in that the mol fraction $n/(n + m)$ is 0.2 to 1.

5. A polyester or random copolyester according to claim 1, characterised in that it contains a radical derived from a diol of the formula

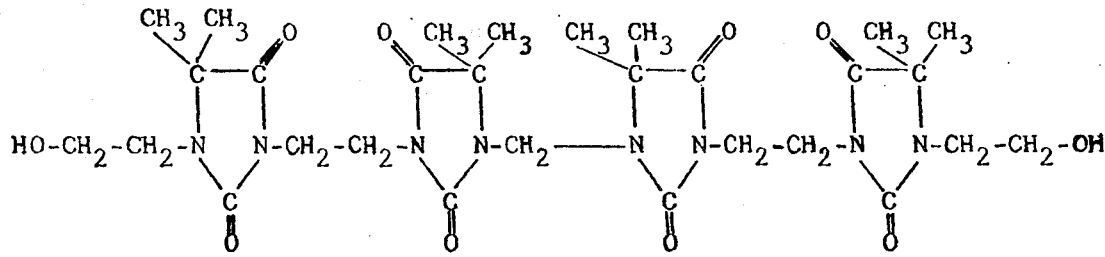

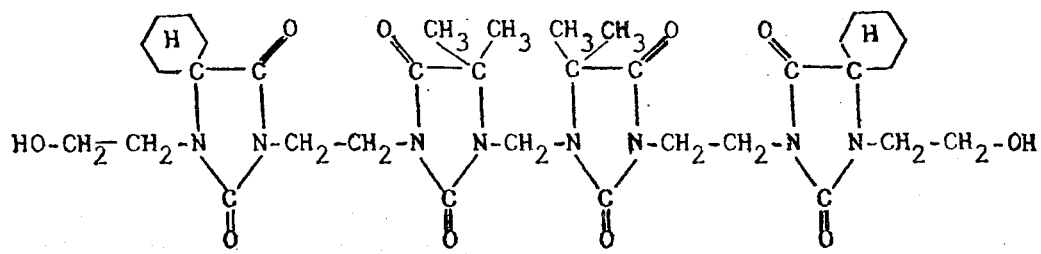

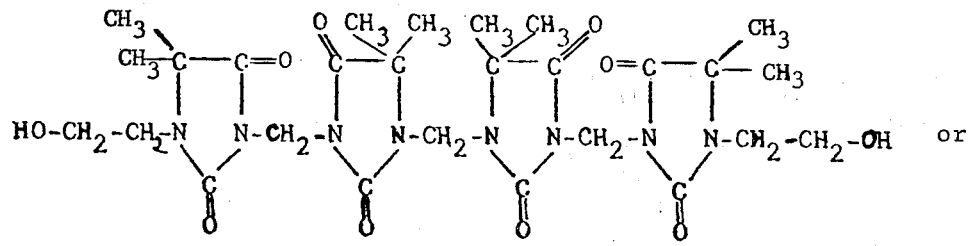

or

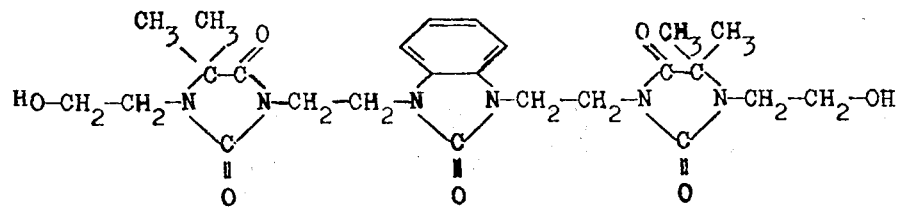

6. A polyester or random copolyester according to claim 1, wherein E denotes the 1,4-dimethylenecyclohexane radical, $U_1$ denotes a radical of the formula
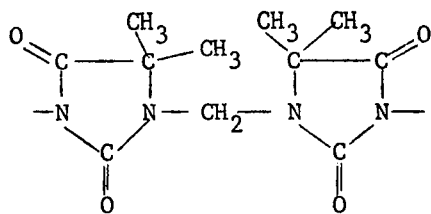
$U_2$ denotes a radical of the formula
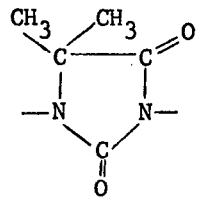
the carbonyl groups are linked to the aromatic rings in the para-position and $n/(n + m)$ being at least 0.5.
* * * * *